United States Patent
Schnaibel et al.

[11] Patent Number: 5,553,450
[45] Date of Patent: Sep. 10, 1996

[54] METHOD AND APPARATUS FOR JUDGING THE FUNCTIONING OF A CATALYTIC CONVERTER

[75] Inventors: Eberhard Schnaibel, Hemmingen; Erich Schneider, Kirchheim; Frank Blischke, Stuttgart, all of Germany

[73] Assignee: Robert Bosch GmbH, Stuttgart, Germany

[21] Appl. No.: 331,761

[22] Filed: Oct. 31, 1994

[30] Foreign Application Priority Data

Nov. 5, 1993 [DE] Germany ............. 43 37 793.9

[51] Int. Cl.$^6$ .................................................. F01N 3/20
[52] U.S. Cl. ................... 60/274; 60/276; 60/277; 60/285
[58] Field of Search .............. 60/274, 276, 277, 60/285

[56] References Cited

U.S. PATENT DOCUMENTS 4,622,809 11/1986 Abthoff et al. ............... 60/274
5,159,810 11/1992 Grutter ......................... 60/277

FOREIGN PATENT DOCUMENTS

3443649A1 6/1986 Germany.

*Primary Examiner*—Douglas Hart
*Attorney, Agent, or Firm*—Kenyon & Kenyon

[57] ABSTRACT

A method, including an amplitude evaluation of control oscillations of the oxygen content of the exhaust gas of an internal combustion engine in front of and behind a catalytic converter, for judging the operating condition of the converter in order to determine whether the performance of the catalytic converter has deteriorated past a predetermined point. As soon as this condition is detected using the amplitude evaluation, switching is effected to the frequency evaluation for judging the functioning of the catalytic converter.

8 Claims, 2 Drawing Sheets

METHOD AND APPARATUS FOR JUDGING THE FUNCTIONING OF A CATALYTIC CONVERTER

FIELD OF THE INVENTION

The present invention relates to a method and apparatus for judging the functioning of a catalytic converter on a motor vehicle. More specifically, the present invention relates to a method and apparatus for determining whether a catalytic converter should be replaced because its conversion power has decreased to the extent that an impermissibly high emission of noxious gas is to be feared.

BACKGROUND OF THE INVENTION

There are a number of methods for judging the functioning of a catalytic converter. One known approach for judging the functioning of a catalytic converter is based on the principle of amplitude evaluation, while another known approach is based on frequency evaluation.

A method using frequency evaluation is known from German Published Patent Application No. DE 34 43 649. In accordance with the method described therein, a two-position mixture control for the engine is effected. The mixture control is namely effected with the help of the signal of a probe arranged behind the catalytic converter as an actual control signal. In accordance with this method, the control frequency of the mixture control is determined and compared with a frequency threshold value. If the control frequency is found to be higher than the frequency threshold value, the catalytic converter is considered to be in condition for replacement. This method is based on recognition of the fact that if a catalytic converter is converting well, it takes a relatively long time until a change in the mixture, making the mixture richer or leaner, affects the exhaust flow leaving the catalytic converter. This long dead time after a change in the mixture from rich to lean, or from lean to rich, leads to a lower control frequency. The poorer the catalytic converter converts, the shorter the dead time and therefore the greater the control frequency.

A method for judging the functioning of a catalytic converter based on amplitude evaluation is described in U.S. Pat. No. 4,622,809. In the method described therein, a two-position mixture control for an engine is effected using the signal of a probe arranged in front of the catalytic converter as a control signal. By means of a probe arranged behind the catalytic converter, it is determined whether the control variations of the oxygen content which occur at the inlet of the catalytic converter are also noticeable at the outlet of the converter. As long as the catalytic converter is converting well, no control oscillation can be noted at its outlet. With aging of the catalytic converter, however, oscillations of the oxygen content of the exhaust gas also occur at the probe behind the catalytic converter. Such oscillations in oxygen content can also be intentionally produced by operating the engine with changed control parameters which lead to greater amplitudes of oscillation at the inlet of the catalytic converter. Furthermore, the testing of the catalytic converter can be carried out only under given operating conditions of the engine, for instance during idling. A large number of detailed methods are known for the amplitude evaluation.

Of the evaluation methods mentioned above, frequency evaluation is more sensitive than amplitude evaluation. Frequency evaluation systems, however, are less popular than amplitude evaluation systems because the testing of a catalytic converter by means of the frequency method has a strong effect on the quietness of operation of the engine and the emission of pollution gas, which is undesired.

SUMMARY OF THE INVENTION

An object of the present invention is to provide a method and an apparatus for judging the functioning of a catalytic converter, which method and apparatus are sensitive, yet have no detrimental effect on the quietness of operation or the emission of pollution gas of an engine on which the catalytic converter is installed. The apparatus of the present invention is used to practice the method of the present invention.

The method of the present invention combines amplitude evaluation, which is relatively inexact but friendly to the operation of the engine, and frequency evaluation, which is more sensitive. In this connection, amplitude evaluation is carried out as long as the condition of the catalytic converter is still relatively good (e.g., has not substantially aged). In this case, it is uneccessary to judge, in a sensitive manner and with as much accuracy as possible, whether the converter should be replaced or not. However, as soon as control variations at the outlet of the catalytic converter are noted which satisfy a certain condition, or even as soon as such variations are noted at all, the method of the present invention switches to a frequency evaluation mode for any further testing.

This manner of procedure is based on the recognition that when the catalytic converter is already relatively aged, the frequency method no longer acts in a detrimental manner on the operation of the engine. In this case, the catalytic converter adds only a relatively short dead time, which is a function of the converting power of the catalytic converter, to the gas feed dead time corresponding to the time of travel of an air/fuel mixture from the time of injection of the fuel until the time of reaching the lambda probe in front of the catalytic converter after being processed by the engine. If the gas-feed time is, for instance, 0.5 sec and with it the control frequency is 1 Hz upon control with the signal of the front probe as actual control signal, then the total dead time from the time of a change in the amount of fuel injected until the time of change in the mixture at the rear oxygen probe is about 10 sec, in the case of a new catalytic converter. However, in the case of a catalytic converter which is aged to such an extent that control amplitudes at its outlet are recognizable under normal control operation, the total dead time is only about 2 to 3 seconds. The last-mentioned lengthening of the total dead time causes changes in the mixture effected by the two-position mixture control which can still be tolerated without impairing the operation of the engine and the emission of pollution gases.

While previous methods for judging the functioning of a catalytic converter in order to increase the sensitivity of the judgment or to avoid disturbance in travel were directed at carrying out the judgment under predetermined operating conditions, particularly upon idling, no such limitation exists for the method of the present invention. Only in exceptional cases of engines which are to be operated very critically with reference to the testing procedure would it be advisable to make the judgment under special engine operating conditions, particularly upon idling.

DETAILED DESCRIPTION OF THE DRAWINGS

Figure 1:
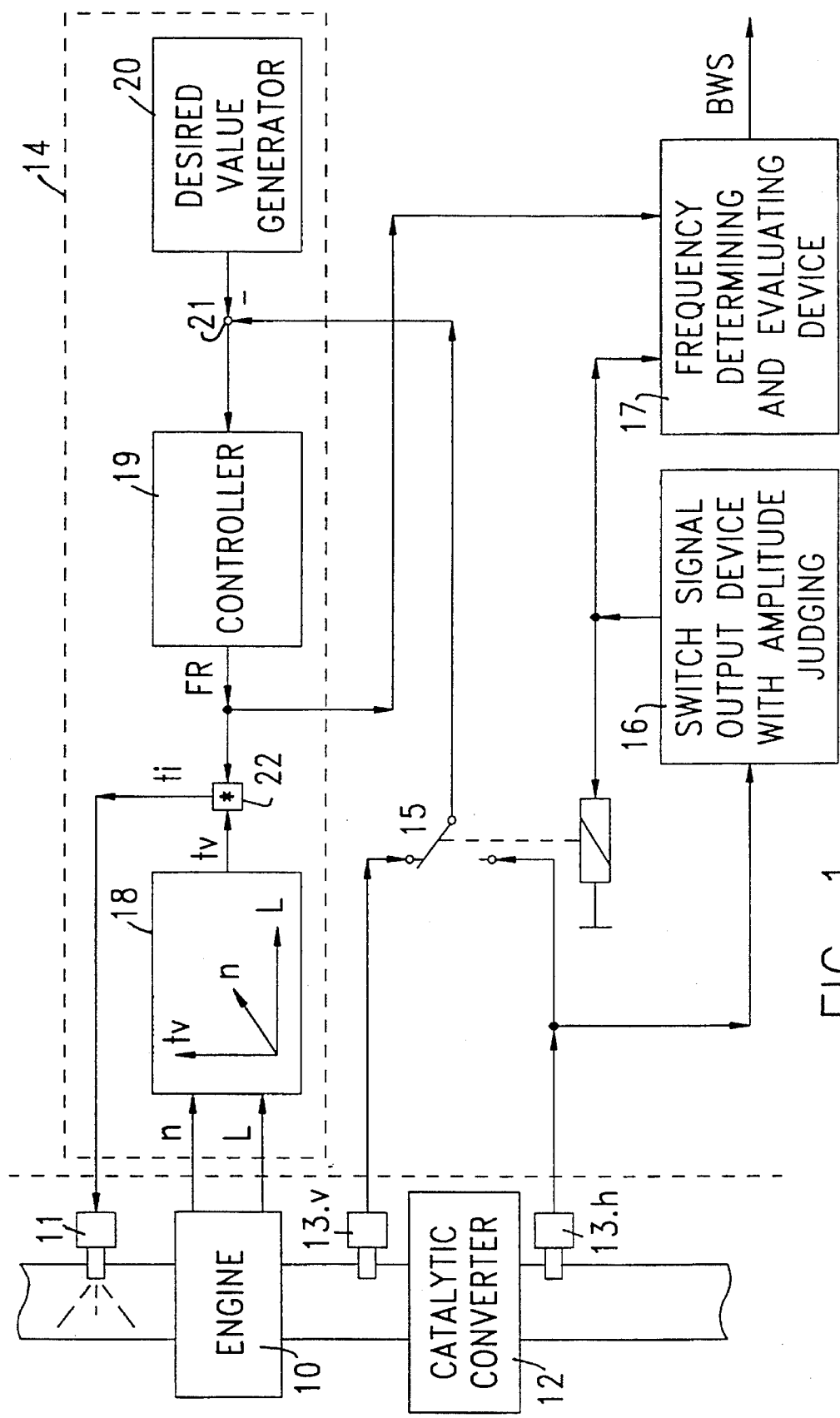
FIG. 1 is a functional block diagram of an apparatus for judging the functioning of a catalytic converter, in accordance with the present invention.

FIG. 1 shows a judgment apparatus, to the right of the dashed line, which is used on an engine 10. An injection valve arrangement 11 is provided in the intake line of the engine 10. A catalytic converter 12 with an oxygen probe 13.v arranged in front of the converter and an oxygen probe 13.h arranged behind the converter, are located in the exhaust-gas line of the engine 10.

The judgment apparatus of the present invention includes a control device 14, a switching device in the form of a change-over switch 15, a switch-signal output device 16, and a frequency determining and evaluating device 17 which generates an evaluation signal BWS which indicates with a high level that the catalytic converter 12 should be replaced. The control device 14 includes an injection-time precontrol characteristic field 18, a controller 19, a desired-value generator 20, a control-variable subtracter 21, and a correction multiplier 22.

The structure which has been described up to now can be derived from the description of the known functionality contained in, for example, German Published Patent Application No. DE 34 43 649, with the difference, however, that in that case the switch-signal output device 16 is merely a device which, in the event of the presence of certain motor operating conditions or upon manual switching, switches to a test position in which the functioning of the catalytic converter 12 is determined by a frequency method such as is carried out in the frequency determining and evaluating device 17. In the apparatus of the present invention, on the other hand, the switch-signal output device 16 itself performs a testing, using an amplitude method, for judging the functioning of the catalytic converter 12. This will be further described below.

As long as no judgment is reached with the frequency method, the switch 15 is in the position shown in FIG. 1, i.e., the switch couples the output signal of the forward probe 13.v, as an actual control variable, to the control-variable subtracter 21, which subtracts this actual value of the control variable from a desired value generated by the desired-value generator 20. From the difference formed by the subtracter 21, the controller 19 produces, in accordance with a suitable control algorithm—as a rule a PI-algorithm for the two-position control—a control factor FR, which is multiplied in the correction multiplier 22 by a pre-control injection time tv. The pre-control injection time tv is read from the injection-time pre-control characteristic field 18 as a function of the existing values of motor-operation parameters, for instance the speed of rotation n and the load L (for example, position of throttle valve, pressure in suction pipe, volumetric flow of air). With this two-position control, a given control frequency is established which is dependent on the speed of rotation and is typically in the region around 1 Hz.

As can be noted from FIG. 1, the output signal of the rear probe 13.h is always connected to the switch-signal output device 16, even when the switch 15 is connected to the signal of the front probe 13.v. The switch-signal output device 16 carries out a suitable amplitude method for judging the functioning of the catalytic converter 12. In the embodiment shown, the switch-signal output device 16 produces a switch signal as soon as the rear probe 13.h gives off a signal which indicates an oscillation of the oxygen content at the outlet of the catalytic converter, and the average value thereof formed over a predetermined period of time exceeds a predetermined threshold value. The switch 15 is so switched by the switch signal that the signal of the rear probe 13.h is now provided, as actual control variable, to the control-variable subtracter 21. Accordingly, control is effected based on the actual value of the control variable from the rear probe 13.h.

At the same time, the frequency determination and evaluation device 17 is activated by the switch signal, whereupon the device 17 determines the frequency of the signal of the control factor FR fed to it and compares it with a predetermined frequency. As soon as the frequency determined increases above the frequency threshold value, the evaluation signal is set to a high level in order thereby to indicate that the catalytic converter 12 should be replaced.

Figure 2:
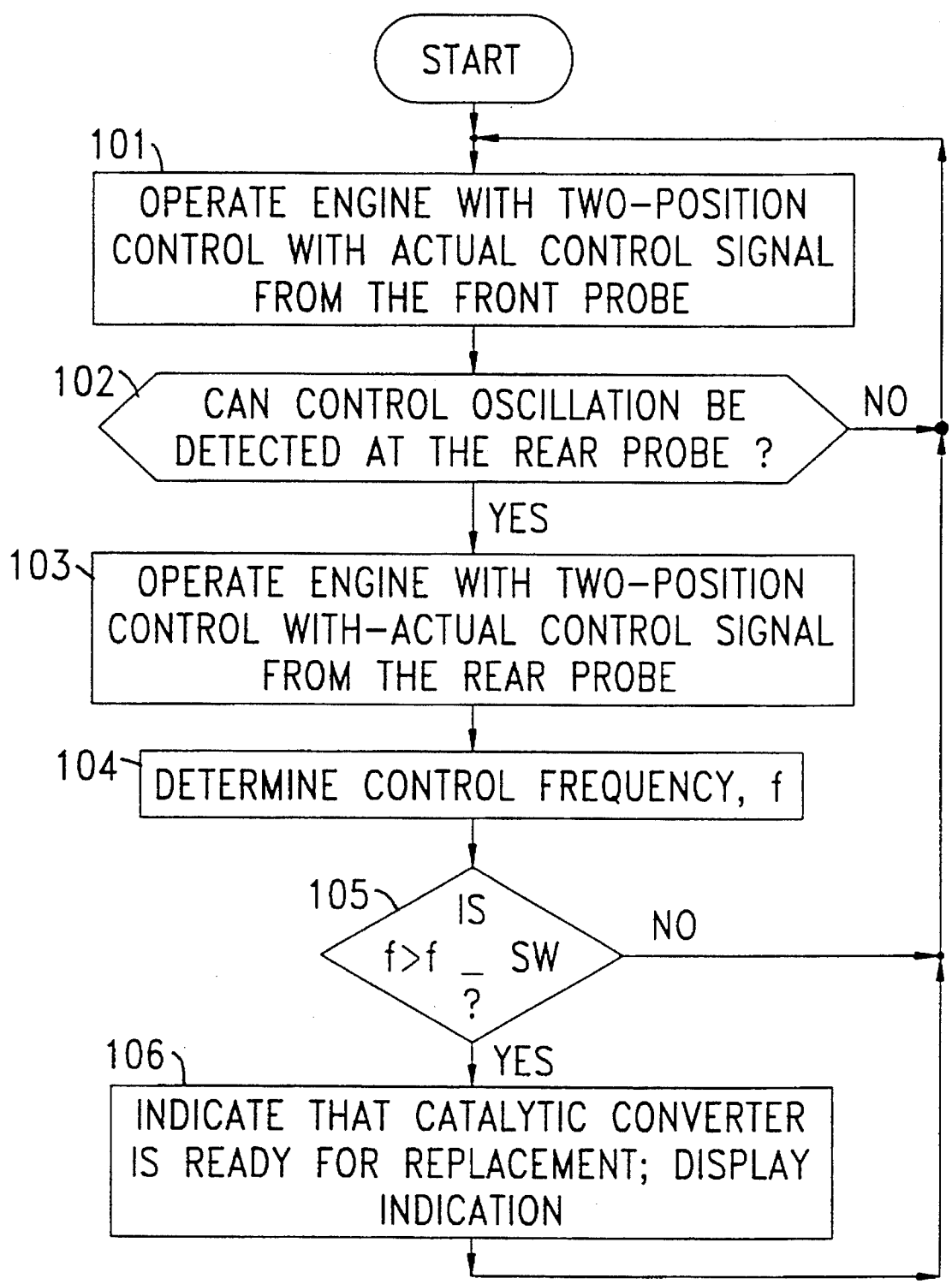
FIG. 2 is a flow chart illustrating a method for judging the functioning of a catalytic converter in accordance with the present invention, which can be carried out with the apparatus of FIG. 1.

The above method which has been explained with reference to FIG. 1 is also shown in FIG. 2. In accordance with FIG. 2, at step 101, after the start of the method, the engine 10 is operated with two-position control with the signal from the probe 13.v in front of the catalytic converter 12. At step 102, it is then determined whether control oscillations can be detected at the rear probe 13.h. If not, operation returns to step 101, otherwise, operation proceeds to step 103 in which the engine is operated with two-position control with the signal of the rear probe 13.h. In this connection, the control frequency f is measured at step 104. If the control frequency f measured is determined at step 105 to be greater than a frequency-threshold value f_SW, the catalytic converter is considered ready for replacement. The determination that the catalytic converter is to be replaced is indicated in step 106, by the lighting of a lamp on the instrument panel and/or by the writing into an error memory which can be read out upon a shop diagnostic process. After step 106, or if it is determined at step 105 that the control frequency lies below the frequency threshold value, operation returns to step 101. The process which has been described is carried out until the engine 10 is shut off.

What is claimed is:

1. A method of judging a functioning of a catalytic converter in an exhaust-gas line of an internal combustion engine, with a first oxygen probe arranged in front of the catalytic converter and a second oxygen probe arranged behind the catalytic converter, comprising the steps of:

a) performing a first two-position mixture control for the engine with a first signal of the first probe as a first actual control signal;

b) judging any control oscillation detected by the second probe behind the catalytic converter;

c) performing a second two-position mixture control for the engine with a second signal of the second probe as a second actual control signal, upon detecting a control oscillation of the second signal which satisfies a predetermined signal amplitude condition;

d) determining a control frequency of the second two-position mixture control;

e) comparing the control frequency to a frequency threshold value; and f) indicating that the catalytic converter is not functioning properly if the control frequency is greater than the frequency threshold value.

2. The method according to claim 1, wherein step c) further includes the step of determining whether a predetermined engine operating condition is present, and wherein the control frequency is determined only if the predetermined engine operating condition is present.

3. The method according to claim 1, wherein the predetermined signal amplitude condition in step c) is that a control oscillation with an amplitude at least as great as a predetermined threshold is detected in the second signal.

4. The method according to claim 1, wherein the first and second two-position mixture controls are performed with the use of special test parameters.

5. The method according to claim 1, wherein steps c)–f) are performed only if a predetermined engine operating condition is present.

6. The method according to claim 2, wherein the predetermined engine operating condition is idling.

7. The method according to claim 5, wherein the predetermined engine operating condition is idling.

8. An apparatus for judging a functioning of a catalytic converter in an exhaust-gas line of an internal combustion engine, with a first oxygen probe arranged in front of the catalytic converter and a second oxygen probe arranged behind the catalytic converter, the apparatus comprising:

a control device for effecting a two-position mixture control for the engine with a first signal of the first probe as a first actual control signal;

a switching device controlled by a switch signal to selectively couple, to the control device, one of the first signal of the first probe and a second signal of the second probe as a second actual control signal;

a switch-signal generation device for judging any control oscillation which can be detected in the second signal of the second probe when the engine is operated with the two-position mixture control with the first signal of the first probe as the first actual control signal, and for generating the switch signal when the control oscillation satisfies a predetermined amplitude condition, to control the switching device to couple the second signal of the second probe as the second actual control signal to the control device; and an evaluation device for determining a control frequency of the two-position mixture control, for comparing the control frequency to a frequency threshold value, and for indicating that the catalytic converter is not functioning properly if the control frequency is greater than the frequency threshold value.

* * * * *